US012719187B2

(12) United States Patent
Zeng et al.

(10) Patent No.: US 12,719,187 B2
(45) Date of Patent: Aug. 25, 2026

(54) ELECTRONIC DEVICE WITH ROTATABLE CONNECTOR

(71) Applicant: BIZLINK (KUNSHAN) CO., LTD., Kunshan (CN)

(72) Inventors: Guoliang Zeng, Kunshan (CN); Dayi Peng, Kunshan (CN)

( * ) Notice: Subject to any disclaimer, the term of this patent is extended or adjusted under 35 U.S.C. 154(b) by 348 days.

(21) Appl. No.: 18/477,570

(22) Filed: Sep. 29, 2023

(65) Prior Publication Data

US 2024/0113456 A1 Apr. 4, 2024

(30) Foreign Application Priority Data

Sep. 30, 2022 (CN) ........................ 202211209771.2

(51) Int. Cl.

| | |
|---|---|
| ***H01R 12/70*** | (2011.01) |
| ***H01R 13/447*** | (2006.01) |
| ***H01R 13/629*** | (2006.01) |
| ***H01R 35/04*** | (2006.01) |

(52) U.S. Cl.

CPC ....... *H01R 12/7088* (2013.01); *H01R 13/447* (2013.01); *H01R 13/629* (2013.01); *H01R 35/04* (2013.01)

(58) Field of Classification Search

None

See application file for complete search history.

(56) References Cited

U.S. PATENT DOCUMENTS 6,162,062 A * 12/2000 Liao ........................ H01R 39/10 439/17
6,638,074 B1 * 10/2003 Fisher ..................... H01R 35/04 439/18
7,125,257 B1 * 10/2006 Liang ...................... H01R 35/04 439/27
8,096,817 B2 * 1/2012 Lee ........................ H01R 29/00 439/640
2006/0073725 A1 * 4/2006 Liao ........................ H01R 27/02 439/304
2016/0064884 A1 * 3/2016 Sung ....................... H01R 35/00 439/131
2022/0140554 A1 * 5/2022 Lybik ................... H01R 25/006 439/39
2022/0285900 A1 * 9/2022 Pan ........................ H01R 35/04

FOREIGN PATENT DOCUMENTS

CN 208834294 U 5/2019
CN 216251481 U 4/2022

* cited by examiner

*Primary Examiner* — Oscar C Jimenez

(74) *Attorney, Agent, or Firm* — SOROKER AGMON NORDMAN

(57) ABSTRACT

Disclosed is an electronic device. The electronic device includes a base and a rotary module. The upper surface of the base has a first through-hole, and the rotary module is movably connected with the base. The rotary module includes a connector with an upper end passing through the upper surface of the base via the first through-hole, the connecter capable of being rotated relative to the base. The electronic device is applicable to various application scenarios and more convenient to use, can effectively avoid wire twisting or wire stucking, and meets the requirement of high-speed signal and electric energy transmission.

5 Claims, 4 Drawing Sheets

ELECTRONIC DEVICE WITH ROTATABLE CONNECTOR

TECHNICAL FIELD

The disclosure relates to the field of electronic devices, and specifically, to an adapter, particularly an adapter allowing rotatably connection.

BACKGROUND

An ordinary electronic device (such as an adapter or a transformer) in the market is connected to a load (such as a docking station or like) via a flexible cable.

To meet the functional requirement that the connected load can be rotated relative to the electronic device, some solutions have been described in the conventional art. For example, the Chinese patent of patent publication No. CN216251481U discloses a rotatable docking station, including a base and a housing mounted on the base, wherein, to realize the rotation of the housing, a rotary shaft is disposed on the base and connected to the upper housing through a wire within the rotary shaft, such that the wire within the rotary shaft is capable of moving during rotation. Another example is the Chinese patent of patent publication No. CN208834294U discloses a rotatable interface device, including a housing with an interface window on its side, wherein, a rotatable circuit board is disposed in the housing, and different interface components can be aligned with the interface window by rotating the circuit board at different angles.

However, the solutions disclosed at present at least have the following defects: the rotation of two parts depends on a retractable wire, the configuration is complex, and there is a risk of the wire being stuck, twisted, or disconnected.

SUMMARY

An object of the present disclosure is to provide an electronic device, with which a connector that allows rotary connection.

The first aspect of the present disclosure relates to an electronic device, comprising:

- a base, having an upper surface with a first through-hole; and
- a rotary module, movably connected with the base, the rotary module comprising a connector with an upper end passing through the upper surface of the base via the first through-hole, the connecter capable of being rotated relative to the base.

In some embodiments, in addition to any one or a combination of more of the aforementioned technical solutions, the rotary module further comprises a first PCB, the connector is electrically connected and secured with the first PCB, the base further comprises a second PCB and a terminal set, the second PCB is electrically connected to the first PCB via the terminal set.

In some embodiments, in addition to any one or a combination of more of the aforementioned technical solutions, a maximum rotational angle between the connector of the rotary module and the base is greater than or equal to 720°.

In some embodiments, the rotary module further comprises a cover, the cover mounted on the first PCB, the cover has a second through-hole for the upper end of the connector to pass therethrough.

In some embodiments, in addition to any one or a combination of more of the aforementioned technical solutions, the base further comprises a carrier, the carrier has an upper stepped surfaces and a lower stepped surface, the upper flat surface secured with the upper surface of the base and supports the cover.

In some embodiments, in addition to any one or a combination of more of the aforementioned technical solutions, the base further comprises a power input port, the base has a side surface opened with a side hole, and an outer end of the power input port is exposed via the side hole.

In some embodiments, in addition to any one or a combination of more of the aforementioned technical solutions, the terminal set comprises at least one signal terminal and at least one power supply terminal, the signal terminal and the power supply terminal is a retractable terminal respectively.

In some embodiments, in addition to any one or a combination of more of the aforementioned technical solutions, each of the signal terminal and the power supply terminal is a pogo pin respectively, and the electronic device is an AC-DC transformer.

In some embodiments, in addition to any one or a combination of more of the aforementioned technical solutions, a lower end of each of the signal terminal and power supply terminal is fixed on the second PCB respectively, a lower surface of the first PCB has a plurality of circular or arc-shaped sliding contact tracks, and an upper end of each of the signal terminal and the power supply terminals contacts one of the sliding contact tracks respectively; or

- an upper end of each of the signal terminal and the power supply terminal is fixed on the first PCB, an upper surface of the second PCB has a plurality of circular or arc-shaped sliding contact tracks, and a lower end of each of the signal terminal and the power supply terminal contacts one of the sliding contact tracks respectively.

The second aspect of the present disclosure relates to an electronic equipment suite, comprising a load and the electronic device as described above, wherein the load is provided with a socket suitable for insertion of the connector.

The present disclosure further relates to an adapter, comprising:

- a base having an upper surface and a side surface;
- a power input port, disposed in the base and being exposed via the side surface;
- a PCB, fixed in the base;
- a signal terminal, protrudes at least partially from the upper surface of the base and electrically connected to the PCB, the signal terminal being a retractable terminal; and
- a power supply terminal, protrudes at least partially from the upper surface of the base and electrically connected to the PCB, the power supply terminal being a retractable terminal;
- wherein, the PCB is adapted to input power from the power input port and output power to the power supply terminal.

The technical solution provided by the present disclosure has the following main beneficial effects:

- since the rotary module and the base can be rotated, the electronic device or the combination of the electronic device and the load is applicable to various application scenarios, meets various application requirements of users, and is more convenient to use; and
- since the first PCB and the second PCB are connected through the sliding contact tracks and can be rotated relative to each other, the problem of wire twisting or stucking can be avoided.

BRIEF DESCRIPTION OF DRAWINGS

To clearly illustrate the technical solutions in the embodiments of the present application or the prior art, the accompanying drawings will be briefly introduced below. The accompanying drawings in the following description are merely some embodiments recorded in the present application, and persons of ordinary skill in the art may still derive other drawings from these accompanying drawings without creative efforts.

REFERENCE NUMERALS

1—rotary module; 11—first PCB; 12—connector; 13—cover; 2—base; 21—lower housing; **21*a*—side surface; 21*b*—side hole; 22—upper housing; 22*a*—upper surface; 22*b*—first through-hole; 23—second PCB; 24—carrier; 25—first screw set; 26—second screw set; 27—terminal set; 271—signal and power supply terminal; 28**—power input port.

DESCRIPTION OF EMBODIMENTS

In order to allow those skilled in the art to better understand the solution of the present disclosure, the technical solution in the embodiments of the present disclosure will be clearly and completely described below with reference to the accompanying drawings in the embodiments of the present disclosure, and it is obvious that the described embodiments are merely part of the embodiments of the present disclosure rather than all of them. Based on the embodiments of the present disclosure, all other embodiments obtained by those of ordinary skill in the art without creative efforts shall fall within the protection scope of the present disclosure.

It should be noted that the terms “first”, “second” and the like in the specification, claims, and above accompanying drawings of the present disclosure are used to distinguish similar objects and are not necessarily used to describe a specific order or sequence. It should be understood that the data used in this way can be interchanged under appropriate circumstances so that the embodiments of the present disclosure described herein can be implemented in other orders than those illustrated or described herein. The expression “comprising/including/provided with first parts” or “comprising/including/provided with a first part” in the specification and claims of the present disclosure means that without conflicting with the originally recorded contents, there is only one first part or there are multiple or a plurality of first parts.

Figure 4:
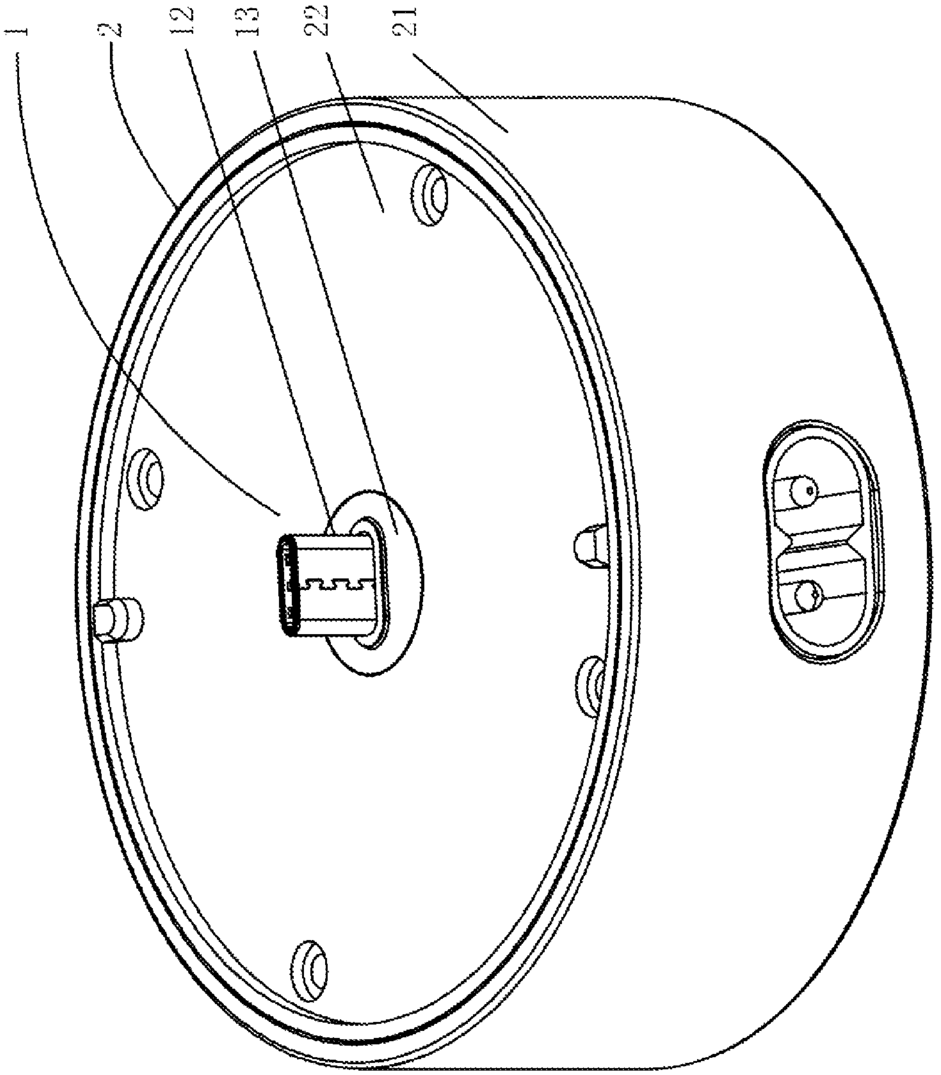
FIG. 4 shows a schematic stereogram of the configuration of the electronic device, according to an exemplary embodiment of the present disclosure.

In one embodiment of the present disclosure, an electronic device is provided. As shown in FIG. 4, the electronic device is an adapter designed to bridge two interfaces or systems, such as connecting a power grid to an external device. More specifically, the electronic device is an AC-DC transformer for supplying DC power to an external device (such as a docking station or any other portable device), which the external device may be embedded, and rotary secured with the electronic device via the top surface thereof and may have a signal exchange function. The AC-DC converting function is optional while both the input and output are DC/AC power.

The electronic device mainly includes a rotary module 1 and a base 2. The configuration and essence of the electronic device will be described below with a specific embodiment. In addition, the diagrams in FIGS. 1 to 4 are drawn to the true scale. To keep the description concise, the scales of all the elements are not listed one by one, but the scale and position of each element should be taken as part of the content of the present specification.

Figure 1:
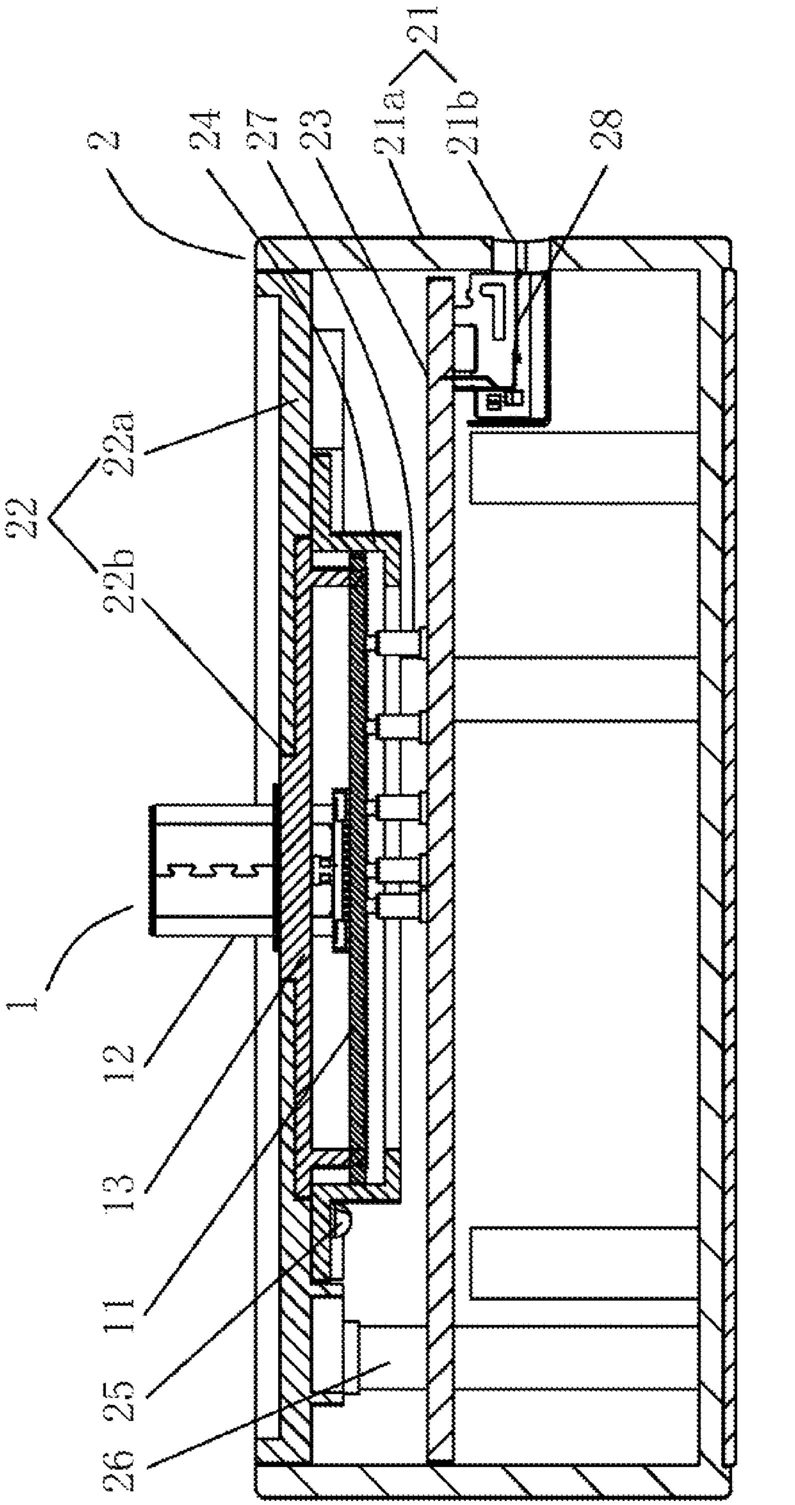
FIG. 1 shows a first schematic sectional view of the configuration of an electronic device, according to an exemplary embodiment of the present disclosure.
Figure 2:
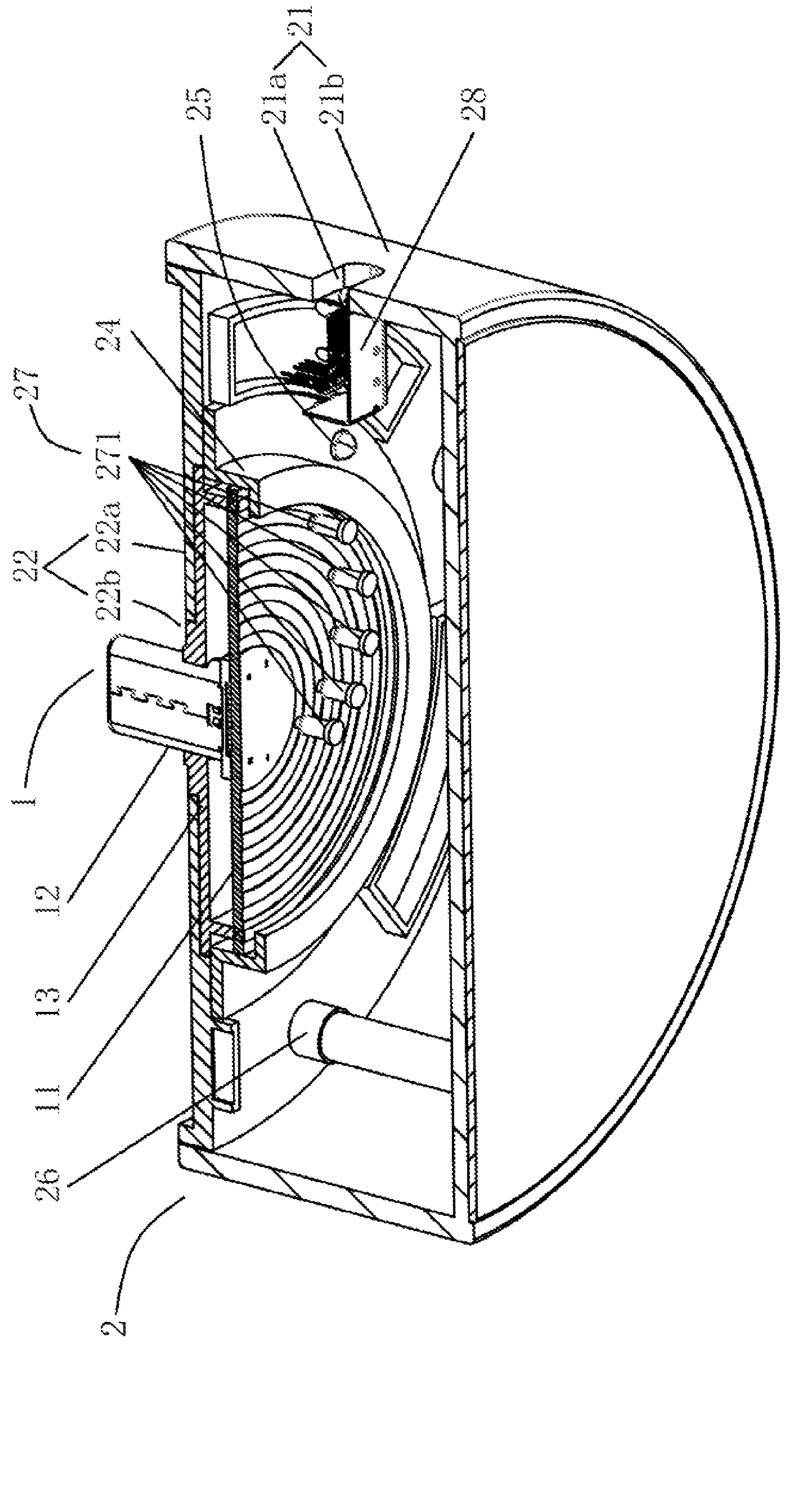
FIG. 2 shows a second schematic sectional view of the configuration of the electronic device, omitting the second PCB, according to an exemplary embodiment of the present disclosure.

Further referring to FIGS. 1 and 2, the rotary module 1 includes a first PCB 11, a connector 12, and a cover 13. The base 2 includes a lower housing 21, an upper housing 22, a second PCB 23, a carrier 24, a first screw set 25, a second screw set 26, a terminal set 27, and a power input port 28.

Figure 3:
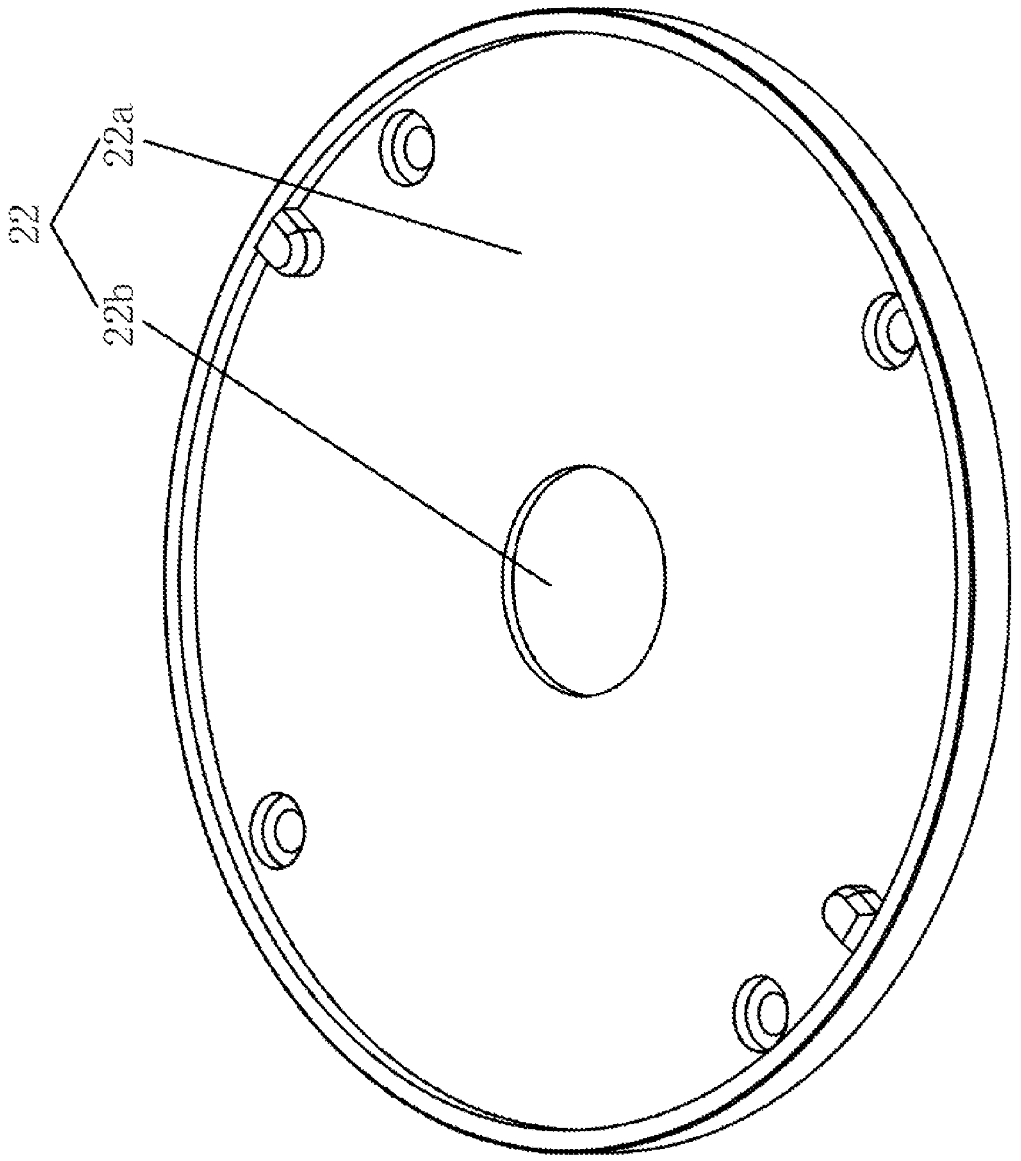
FIG. 3 shows a schematic structural diagram of an upper housing of the electronic device, according to an exemplary embodiment of the present disclosure.

As shown in FIG. 3, the upper housing 22 is provided with an upper surface **22*a*, and a first through-hole 22*b* is disposed on the upper surface 22*a*. The upper surface 22*a*** of the base has a substantially circular recess with a plurality of projecting blocks formed along the edge of the said recess. The recess allows an external device to be rotatably placed therein, and the rotational angle may be adjusted by adjusting the number and positions of projecting blocks at the side edge of the recess. The plurality of projecting blocks may be removed to allow the inner edge of the recess to be a smooth surface if needed, to allow the external device to rotate at any angle, larger than 720 degrees.

The lower housing 21, is cylindrical shaped, coverless hollow container. The lower housing 21 has a side surface **21*a* with a through side hole 21*b***.

The terminal set 27 includes a plurality of signal terminals 271 and power supply terminals 271.

The cover 13 of the rotary module 1 includes a circular upper plate and a continuous ring-shaped projection extending downward from the lower surface of the upper plate. Specifically, the projection may be located close to the edge of the upper plate, the edge of the cover 13 extends beyond the said extension. Moreover, The continuous ring-shaped projection can be replaced by a plurality of projection parts disposed at intervals to form a ring-like structure with intervals.

Further details are described below.

As depicted in FIG. 1, the rotary module 1 is movably embedded in the base 2. The upper end of the connector 12 passes through the upper surface **22*a* of the upper housing 22 via the first through-hole 22*b*, and the connector 12 can be rotated relative to the base 2. When the rotary module 1 rotates to the base 2, the first PCB 11 is electrically connected with the second PCB 23 via the terminal set 27**.

For example, the connector 12 is a board-end USB connector. In detail, the connector 12 is an SMT USB Type-C male end connector (plug) soldered on the upper side of the first PCB 11 for transmitting signals and/or power. The connector 12 may be replaced by connectors of other specifications, regardless of whether or not it has a signal transmission function. In addition, the connector 12 may be replaced by a female end (socket) connector if needed. The middle portion of the connector 12 is secured with the cover 13. For example, the cover 13 is connected to the connector 12 by plastic packaging, gluing, insert molding, a flexible sealing ring, or like.

The carrier 24 of the base 2 is secured on the bottom of the upper housing 22 by the first screw set 25. The upper housing 22 is secured with the lower housing 21 by the second screw set 26, and an accommodating chamber is formed between the fixedly connected upper housing 22 and lower housing 21 to accommodate the first PCB 11, the cover 13, the second PCB 23, the carrier 24, the terminal set 27, the power input port 28, and other components are not mentioned.

Carrier 24 has an upper step surface and a lower step surface. The upper step surface of the carrier 24 is secured to the upper surface 22*a* of the upper housing 22. At least a part of the upper step surface of the carrier 24 extends beyond the upper housing 22 to form a ring-shaped platform at the edge of the upper step surface for allowing the cover 13 to be supported thereon. Moreover, the end of the projections of the cover 13 are secured to the first PCB 11, as depicted in FIG. 1. Thus, when the connector 12 is rotated, the cover 13 can be driven to rotate in the space between the upper step surface of the carrier and the upper housing 22, while the vertical movement thereof can be limited. Meanwhile, since the first PCB 11 is secured to the cover 13, the first PCB 11 can rotate accordingly.

In another embodiment, the upper step surface may push the cover 13 against the lower surface of the upper housing 22, and the lower flat surface on the carrier 24 is configured to support the edge of the first PCB 11 and push the first PCB 11 against the lower end of the projection on the cover 13 for the same purpose.

As depicted in FIG. 1, the second PCB 23 is rotatably connected to the first PCB 11 through the terminal set 27, and the maximum rotational angle between the rotary module 1 and the base 2 is greater than or equal to 720°, so that the connector 12 can be horizontally rotated twice or more times relative to the base 2.

As depicted in FIG. 1, the power input port 28 is an AC socket type SMT connector for receiving power from the power grid, the power input port 28 is electrically connected with the connector 12 via an AC-DC converting module and the first PCB 11. Moreover, in the present embodiment, the AC-DC converting module is integrated as a part of the first PCB 11. In another embodiment, the AC-DC converting modules can be disposed in the space below the first PCB 11 as an independent component. In another embodiment, the power input port 28 may be a DC SMT socket type connecter for receiving DC power, such as a USB type C connector, and the AC-DC converter can therefore be omitted accordingly.

As depicted in FIG. 1, the inner end of the power input port 28 is soldered to the second PCB 23, and the outer end of the power input port 28 is exposed via the side hole 21*b*. It should be noted that the exposure of the power input port 28 is not limited to extending out of the side surface 21*a*, but it should be understood that the end of the power input port 28 can be observed from the side hole 21*b* without the aid of an observation instrument, and it can be flushed with the side surface 21*a* or slightly retracted into or protruded out of the side surface 21*a*.

Referring to FIG. 2, in one embodiment, each signal terminal 271 and power supply terminal 271 is a retractable terminal (for example, a pogo pin), which may meet the requirement of signal and electrical energy/power transmission. The lower end of each of the signal and power supply terminals 271 is electrically connected and fixed on the second PCB 23, and the lower surface of the first PCB 11 is disposed with a plurality of circular sliding contact tracks, and the upper end of each of the signal terminals 271 and power supply terminals 271 contacts one of the sliding contact tracks respectively. When the connector 12 drives the first PCB 11 to rotate, each signal terminal 271 and power supply terminal 271 are kept in contact with one of the sliding contact tracks without deviation or track change respectively. In the present embodiment, the solution of rotating the connector 12 relative to the base 2 avoids the problem of wire twisting or stucking because it does not adopt a wiring way. In a design scenario where the rotational angle of the connector 12 is limited to less than 360°, the sliding contact tracks may not necessarily be limited to a circular shape but may arc-shaped, and stoppers may be added at the start point and end point of rotation to prevent the signal and power supply terminals 271 from being separated from the arc-shaped sliding contact tracks.

As a replacement of the aforementioned embodiment, in another embodiment, the upper end of each of the signal and power supply terminals 271 is fixed on the lower surface of the first PCB 11, the upper surface of the second PCB 23 has a plurality of circular or arc-shaped sliding contact tracks, and the lower end of each of the signal and power supply terminals 271 contacts one of the sliding contact tracks respectively.

The electronic device in the present embodiment is an adapter, and the power input port 28 is connected to an external power supplying cable connected to, may be, a power grid, and transmits power to the connector 12, directly or indirectly, via the first PCB 11 and the second PCB 23, so as to adaptively supply power and transmit signals to an external load (a media device, such as a docking station and a portable power source) connected to the connector 12.

In another embodiment, the rotary module 1 and the carrier 24 in the base in FIG. 1 may be omitted, the second PCB 23 may then be adjusted upwards, and each signal terminal 271 and power supply terminal 271 in the terminal set 27 connected with the surface of the second PCB 23 may be directly exposed through the upper surface of the upper housing 22. Or say, each signal terminal 271 and power supply terminal 271 may protrude at least partially from the upper surface of the base and electrically connected to the second PCB 23. Meanwhile, the first PCB 11 can be relocated to the bottom of an external device (such as a docking station), and the plurality of circular sliding contact tracks thereof can be exposed via the bottom surface thereof. When an external device (load) is placed on the top of the electronic device, each signal terminal 271 and power supply terminal 271 in the terminal set 27 can be in contact with a plurality of circular sliding contact tracks on the bottom of the external device for connection.

Similarly, "a" and "an" should be understood as including one or at least one unless the context clearly indicates otherwise.

What are described above are merely the specific embodiments of the present application. It should be pointed out that those of ordinary skill in the art can also make a plurality of improvements and embellishments without departing from the principle of the present application, and these improvements and embellishments should also be regarded within the protection scope of the present application.

What is claimed is:

1. An electronic device, comprising:

a base, having an upper surface with a first through-hole; and a rotary module, movably connected with the base, the rotary module comprising a connector with an upper end passing through the upper surface of the base via the first through-hole, the connecter capable of being rotated relative to the base:

a first PCB, the connector being electrically connected and secured with the first PCB; and a cover mounted on the first PCB, the cover comprising a second through-hole for the upper end of the connector to pass therethrough wherein the base comprises;

a second PCB, a terminal set, the second PCB being electrically connected to the first PCB via the terminal set, and a carrier, comprising an upper stepped surface and a lower stepped surface the upper flat surface secured with the upper surface of the base and supporting the cover;

wherein a maximum rotational angle between the connector of the rotary module and the base is greater than or equal to 720°.

2. The electronic device according to claim 1, wherein the base further comprises a power input port, the base has a side surface opened with a side hole, and an outer end of the power input port is exposed via the side hole.

3. The electronic device according to claim 1, wherein the terminal set comprises at least one signal terminal and at least one power supply terminal, the signal terminal and the power supply terminal is a retractable terminal respectively.

4. The electronic device according to claim 3, wherein each of the signal terminal and the power supply terminal is a pogo pin respectively, and the electronic device is an AC-DC transformer.

5. The electronic device according to claim 4, wherein a lower end of each of the signal terminal and power supply terminal is fixed on the second PCB respectively, a lower surface of the first PCB has a plurality of circular or arc-shaped sliding contact tracks, and an upper end of each of the signal terminal and the power supply terminals contacts one of the sliding contact tracks respectively; or an upper end of each of the signal terminal and the power supply terminal is fixed on the first PCB, an upper surface of the second PCB has a plurality of circular or arc-shaped sliding contact tracks, and a lower end of each of the signal terminal and the power supply terminal contacts one of the sliding contact tracks respectively.

* * * * *